N. Ames and J. E. Gowens,

Eyeleting Machine.

No. 2,875. No. 2,880. Reissued Feb. 25. 1868.

" 2,876.

" 2,877.

" 2,878.

" 2,879.

Witnesses.

Henry T. Thomson

George A. Solen

Inventors.

A. P. Ely.

assignee of

Ames & Gowens.

UNITED STATES PATENT OFFICE.

WILLIAM N. ELY, OF STRATFORD, CONNECTICUT, ASSIGNEE, BY MESNE ASSIGNMENTS, OF N. AMES AND J. E. GOWEN.

IMPROVEMENT IN EYELETING-MACHINES.

Specification forming part of Letters Patent No. 64,734, dated May 14, 1867; Reissue No. 2,880, dated February 25, 1868.

DIVISION F.

*To all whom it may concern:*

Be it known that NATHAN AMES, of Saugus Centre, in the county of Essex and Commonwealth of Massachusetts, and JAMES E. GOWEN, of Stoneham, in the county of Middlesex and Commonwealth aforesaid, did invent a new and useful Self Feeding Eyeleting-Machine for Inserting Eyelets in Boots, Shoes, and Leather; and I do hereby declare that the following is a full, clear, and exact description of the construction and operation of the same, reference being had to the accompanying drawings, forming a part of this specification, in which—

Figure 2:
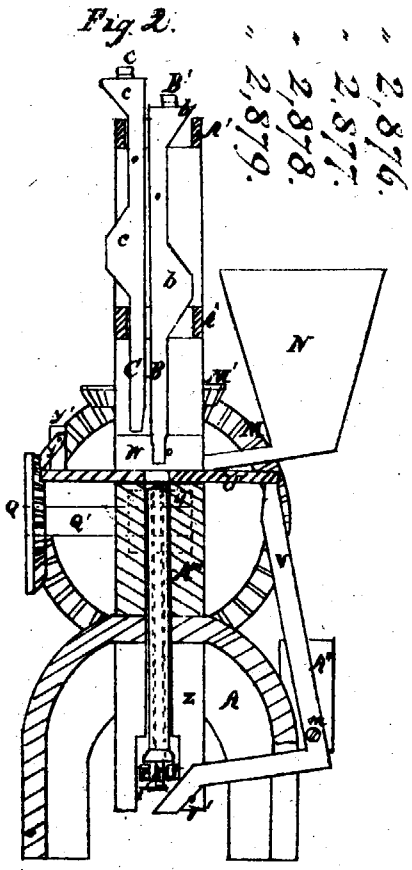
Figure 3:
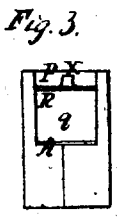
Figure 1:
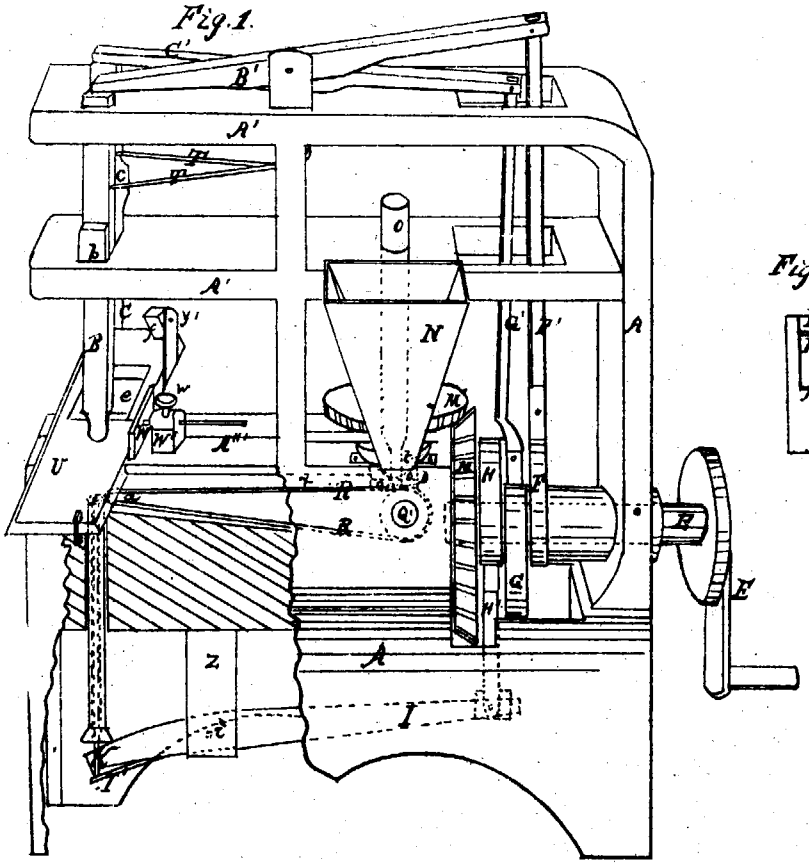

Figure 1 is a perspective side view; Fig. 2, a front elevation; and Fig. 3 is a vertical cross-section through the eyelet-groove.

Like parts are indicated by the same letters in all the drawings.

The nature and object of this invention consist in so constructing a machine for punching and eyleting that the different parts shall be severally automatically operated, and the whole, when combined, so arranged that the material may be supported and moved along, the holes punched, and the eyelets supplied and set by the automatic movements of the mechanism.

To enable others skilled in the art to make and use this invention, I will now proceed to describe its construction and operation.

A is a frame, of suitable material, the general shape of which is shown in Figs. 1 and 2, the part A''' being, for convenience, made in separate parts, so that the endless belt R, with its driving-pulley, &c., may be introduced and adjusted for operation.

B is a punch or cutter, of ordinary construction at its lower end for punching or cutting holes in leather. Its stock is four-sided, and moves in suitable bearings in the frame A' A'. On one side of the stock, as represented in Fig. 2, are wedge-shaped pieces *b b*, and in the ends of the frame A' A' are beveled bearings, against which the wedge-shaped projections *b* slide, being pressed against them by the action of the straight spring T.

C is the header, constructed like headers generally for heading eyelets. The stock is shaped like that of the punch B, and provided with similar wedge-shaped pieces, *c*, and like it sliding in beveled bearings in frame A' A', and held to duty by the action of straight spring T, which in both instances raises the punch and header to their normal position when released from the pressure of operating-levers B' C'. It is intended that the punch B and header C shall, when depressed, strike on or over the same fixed point, which is effected by the wedge-shaped pieces *b* and *c* and their beveled bearings. The punch B and header C are alternately depressed by means of the levers B' and C', which move on the fulcrum D, and are actuated by the pitmen G' and F', the lower ends of which are clasped in the usual manner around the eccentrics F and G, attached to shaft E.

E' is a pulley or crank by which shaft E is turned.

H is another eccentric, attached to shaft E, and connected by pitman H' to the end of lever I, (see dotted lines in Fig. 1,) moving on fulcrum *i*.

J is a hollow rod, the lower end of which rests upon the short end of lever I.

K is a rod passing through J and the slot in end of lever I, and resting on the flat spring I', attached to lever I, which forms for it an elastic seat. The top of the hollow rod J forms the bed or seat on which the eyelet rests while being headed, the same being held in place by the top or end of the rod K, which projects a suitable distance above hollow rod J.

U is a plate of copper or suitable metal, upon the upper side of which the material rests while the hole in it is to be punched. This plate or table U is provided with an opening, *e*, to permit the clinching of the eyelet, and slides laterally in a dovetail or other suitable bearing in the frame, Fig. 1, being reciprocated and carried over the heading-seat J so as to present itself for the punch B to operate upon, and returned at the proper time by means of lever V, which moves on fulcrum *m* in the frame projection A'', the lower end of said lever being bent at an angle, as shown in Fig. 2, and resting against lever I, and is held to duty by spring V′, which keeps said lever V in contact with lever I, and assists in the return of lever V.

Many different ways or devices may be employed to reciprocate the plate or table U at regular intervals and at the proper time without departing from the principle of this part of the invention. In Fig. 1 the cutting-punch B is represented as striking on the plate or table U directly over the end of rod J on which the eyelet rests. After the hole is punched in the leather, the latter being removed, the plate U is drawn back by means hereinbefore described, and the eyelet is forced up through the slot or recess *e* in plate U, and through the punched hole, and headed or clinched by the header C, which descends at the proper time by mechanism hereinbefore described.

W is a guide, adjustable by means of a stud or bar projecting from its rear, and held in a sleeve or socket, W′, attached to the frame by a set screw, *w*.

Y is a pawl or dog pivoted to the upright Y′, attached to the plate U, and moved with or is actuated by it, the object of which is to move the material the distance from one hole to another.

R is an endless belt of suitable material, extending around the pulley *q* and the pin S, the axle of said pulley constituting a part of the eyelet-feeding mechanism, and being driven by the bevel-pinion Q, which engages with the larger bevel-pinion M on the shaft E, pinion M also constituting another part of the eyelet-feeding mechanism hereinafter referred to. A hopper, N, is arranged above this feeding-belt, and has a conductor, *n*, which extends from it to the recess P in the frame, which forms the conduit for the eyelets to the feeding-belt by which they are fed to the heading-seat, as hereinbefore described.

On the under side of the frame A‴, and extending from the hole P, and running parallel with the top of the belt R to the eyelet-heading seat J, is a groove, X, of form shown in Fig. 3. This groove X, Fig. 3, is of proper size and shape to admit an eyelet when standing on its flaring end only, and when an eyelet so standing on the belt R comes against the exposed end of groove X it will be carried forward therein in the direction of the arrow until it reaches the rod K. When K and J are at their lowest point, Fig. 1, the forward eyelet will be carried onward to the heading-seat by the belt, which, as it moves faster than the eyelets are removed one by one, will keep the grooves filled with eyelets, and regularly feed them to the heading mechanism as wanted.

To prevent the eyelets in the recess P from clogging about the end of the groove X, and also to keep them in motion so as to constantly present some one of them, right end up, against the end of the groove, to be carried into it by the belt R, I make use of a vertical shaft, O, provided at its lower end with bristles or flexible arms *o*, which agitate the eyelets. The shaft O is actuated by beveled pinion M′, which is driven by pinion M, which also drives other parts of the feeding mechanism.

The material is held on sliding table U in position, when it will be moved along, the holes punched, and the eyelets inserted and headed. Any motor may be used.

What I claim, and desire to secure by Letters Patent, is—

1. The combination of hollow rod J and lever I, arranged and operating substantially as described.

2. The combination of hollow rod J and piston K, arranged and operating substantially as described.

3. The combination of hollow rod J, piston K, and lever I, arranged and operating substantially as described.

4. The combination of rod J, piston K, spring I′, and lever I, arranged and operating substantially as described.

5. The combination of rod J, piston K, lever I, and header C, arranged and operating substantially as described.

6. The combination of hopper N with eyelet-feeding mechanism and rods J and K and header C, substantially as described.

7. The combination of puncher B and sliding plate U, substantially as described.

8. The combination of plate U and levers V and I, substantially as described.

9. The combination of puncher B, header C, sliding plate U, and rods J and K, substantially as described.

10. The combination of puncher B, header C, plate U, rods J and K, hopper N, belt R, and groove X, substantially as described.

11. The combination of table U and pawl Y, substantially as described, with the set or punch and set of an eyelet-machine.

12. The combination of hopper N with bristles or flexible arms *o*, substantially as described.

WILLIAM N. ELY.

Witnesses:
W. M. PARKER,
CHAS. W. FROST.